(12) United States Patent
Saghir et al.

(10) Patent No.: US 10,045,355 B2
(45) Date of Patent: Aug. 7, 2018

(54) PREEMPTION POLICY FOR A BASE STATION OPERATING IN CLOSED SUBSCRIBER GROUP HYBRID MODE

(71) Applicant: Verizon Patent and Licensing Inc., Arlington, VA (US)

(72) Inventors: Amir Saghir, Frisco, TX (US); Said Hanbaly, Prosper, TX (US); Syed Faraz Iqbal, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

(21) Appl. No.: 15/217,342

(22) Filed: Jul. 22, 2016

(65) Prior Publication Data

US 2018/0027567 A1   Jan. 25, 2018

(51) Int. Cl.
| | |
|---|---|
| *H04W 72/04* | (2009.01) |
| *H04W 72/08* | (2009.01) |
| *H04W 72/10* | (2009.01) |
| *H04L 12/26* | (2006.01) |
| *H04W 48/06* | (2009.01) |
| *H04W 4/08* | (2009.01) |
| *H04W 84/04* | (2009.01) |

(52) U.S. Cl.
CPC ..... *H04W 72/0486* (2013.01); *H04L 43/0882* (2013.01); *H04L 43/16* (2013.01); *H04W 4/08* (2013.01); *H04W 48/06* (2013.01); *H04W 72/048* (2013.01); *H04W 72/087* (2013.01); *H04W 84/045* (2013.01)

(58) Field of Classification Search
CPC . H04W 72/0486; H04W 72/085; H04W 4/08; H04W 72/10; H04W 72/048; H04W 48/06; H04L 43/16; H04L 43/0882
See application file for complete search history.

(56) References Cited

U.S. PATENT DOCUMENTS

| | | | | |
|---|---|---|---|---|
| 2009/0305671 | A1* | 12/2009 | Luft | G06Q 30/0205 455/411 |
| 2010/0227611 | A1* | 9/2010 | Schmidt | H04W 4/06 455/434 |

(Continued)

OTHER PUBLICATIONS

3GPP, "3GPP Specification detail," http://www.3gpp.org/DynaReport/23203.htm, Jul. 21, 2016, 4 pages.

(Continued)

*Primary Examiner* — Chi H Pham
*Assistant Examiner* — Shailendra Kumar

(57) ABSTRACT

A device may receive, from a first user device, a request to access a first resource associated with the device. The first user device may be associated with a closed subscriber group. The device may determine that a congestion level, associated with the device, satisfies a threshold value. The device may identify a second user device that has been allocated a second resource associated with the device. The second user device may not be associated with the closed subscriber group. The device may enable the first user device to preempt the second user device. The device may remove, for the second user device, access to the second resource based on enabling the first user device to preempt the second user device and based on the second user device not being associated with the closed subscriber group.

20 Claims, 8 Drawing Sheets

(56) References Cited

U.S. PATENT DOCUMENTS

2015/0049606 A1* 2/2015 So .................... H04L 47/808
370/230
2017/0231007 A1* 8/2017 Yang ................ H04W 74/0816

OTHER PUBLICATIONS

3GPP, "3GPP TS 23.203: $3^{rd}$ Generation Partnership Project; Technical Specification Group Services and System Aspects; Policy and charging control architecture (Release 13)," https://portal.3gpp.org/desktopmodules/Specifications/SpecificationDetails.aspx?specificationId=810, Mar. 2016, 242 pages.

* cited by examiner

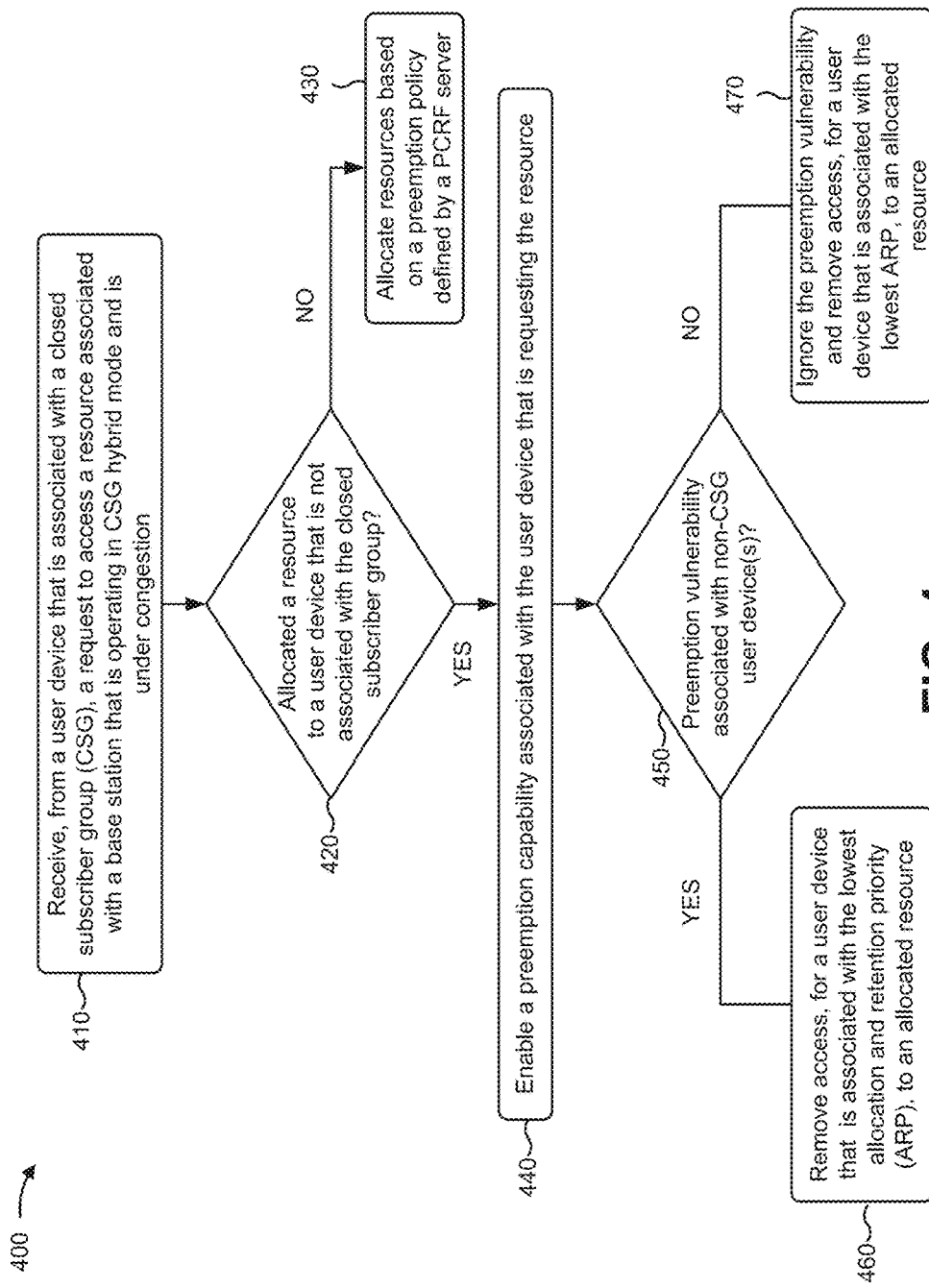

PREEMPTION POLICY FOR A BASE STATION OPERATING IN CLOSED SUBSCRIBER GROUP HYBRID MODE

BACKGROUND

A Home eNode B (HeNB) may provide restricted access to user equipment (UE), such as a Long Term Evolution (LTE) user device, based on association of the UE with a closed subscriber group (CSG). For example, the UE may include a CSG whitelist, which contains CSG identifiers (CSG IDs) associated with CSG cells that the UE may access. The HeNB may operate in a hybrid mode. In hybrid mode, the HeNB may be accessed as a CSG cell by a UE that includes a CSG whitelist that contains the CSG ID of the HeNB, and may be accessed as a normal cell by other UEs.

BRIEF DESCRIPTION OF THE DRAWINGS

FIG. 4 is a flow chart of an example process for implementing a preemption policy for a base station operating in closed subscriber group hybrid mode.

DETAILED DESCRIPTION OF PREFERRED EMBODIMENTS

The following detailed description of example implementations refers to the accompanying drawings. The same reference numbers in different drawings may identify the same or similar elements.

A small, low power base station (e.g., a femtocell base station) may allow a network to be extended beyond a typical range and capacity of macrocell coverage. For example, a HeNB may provide LTE service in places where macrocell coverage is inadequate (e.g., in-buildings, basements, malls, and/or tunnels) and may improve network capacity (e.g., by offloading traffic from other portions of the network). The HeNB may operate in a hybrid mode that allows both CSG member and non-member user devices to access resources, while giving priority to CSG member user devices for resource scheduling. However, no prioritization mechanism has effectively addressed preemption of user devices necessitated by HeNB congestion (e.g., reduced performance as a result of resources being allocated to too many user devices).

Implementations described herein may enable a base station (e.g., a HeNB) to identify a user device to be preempted (e.g., removed from access to a resource) in the event of HeNB congestion. When the HeNB is congested, a preemption capability may be enabled for a CSG member user device requesting to access a resource, and non-member user devices that have been allocated resources may be identified as candidates for preemption. If a non-member user device is determined to be vulnerable (e.g., associated with a preemption vulnerability) then the vulnerable non-member user device may be selected for preemption. If multiple non-member user devices are vulnerable, then a particular non-member user device to be preempted may be determined based on one or more additional factors, such as a quality of service (QoS) parameter, a duration of access to the resource, or the like. If none of the non-member user devices are vulnerable, then the base station may override a preemption vulnerability indicator (PVI) value, and may identify a particular non-member user device to be preempted in a similar fashion.

In this way, network coverage and capacity may be increased by a small, low power base station, such as a femtocell base station (e.g., a HeNB), in a way that allows both CSG member user devices and non-member user devices to access resources when the base station is not congested, while allowing the CSG member user devices to be prioritized over non-member user devices with regard to access to resources during base station congestion. Furthermore, in selecting a non-member user device to preempt, prioritization among the non-member user devices may be established based on information regarding the non-member user devices, such as preemption vulnerability and/or other factors (e.g., QoS parameters), potentially minimizing disruptive impact of the preemption.

Figure 1A:
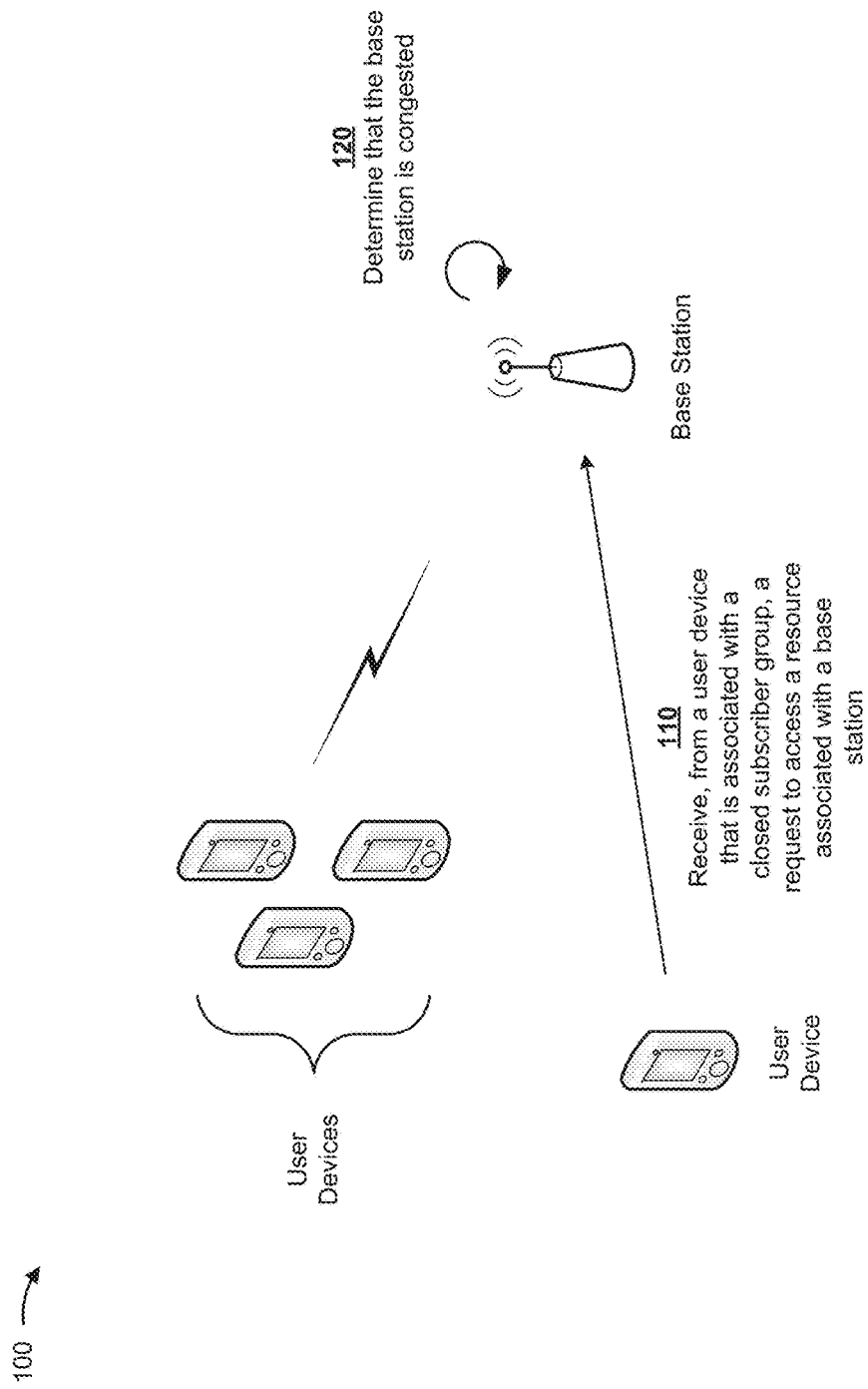
FIGS. 1A-1E are diagrams of an overview of an example implementation described herein.

FIGS. 1A-1E are diagrams of an overview of an example implementation 100 described herein. As shown in FIG. 1A, example implementation 100 may include a base station, such as a femtocell base station (e.g., a HeNB), that has allocated resources to a group of user devices. As shown by reference number 110, the base station may receive, from a user device that is associated with a CSG, a request to access a resource. As shown by reference number 120, the base station may determine that the base station is congested. For example, the base station may determine that, if the requested resource is granted to the requesting user device, network performance could be reduced to an undesirable level (e.g., a level that fails to satisfy a threshold) due to the number of already allocated resources.

Figure 1B:
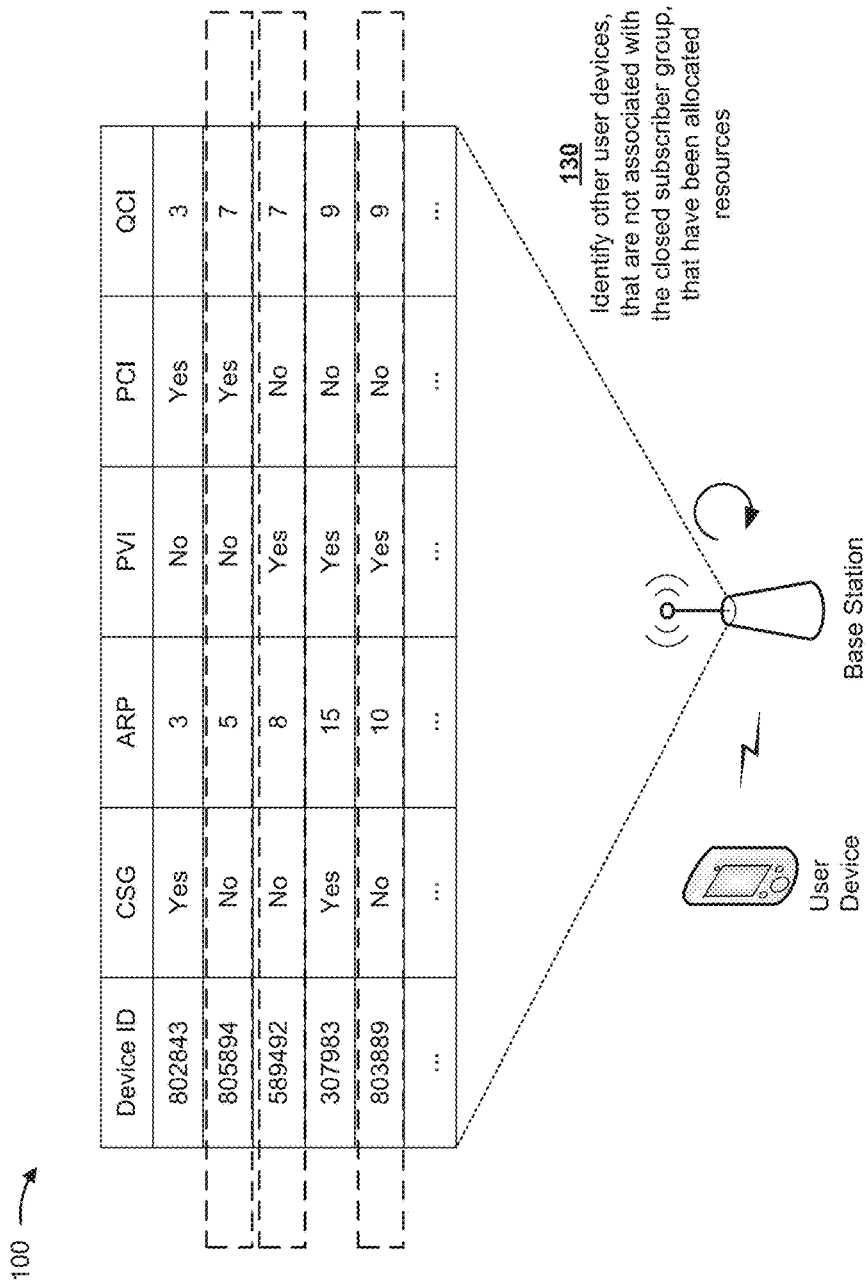

As shown in FIG. 1B, the base station may maintain information for other user devices that are accessing resources associated with the base station. Alternatively, the base station may receive, from another device, information associated with other user devices that are accessing resources associated with the base station. For example, another device may maintain the information, and may provide the information to the base station. As shown by reference number 130, the base station may identify other user devices, that are not associated with the CSG (e.g., devices 805894, 589492, and 803889), that have been allocated resources and/or are accessing resources associated with the base station.

Figure 1C:
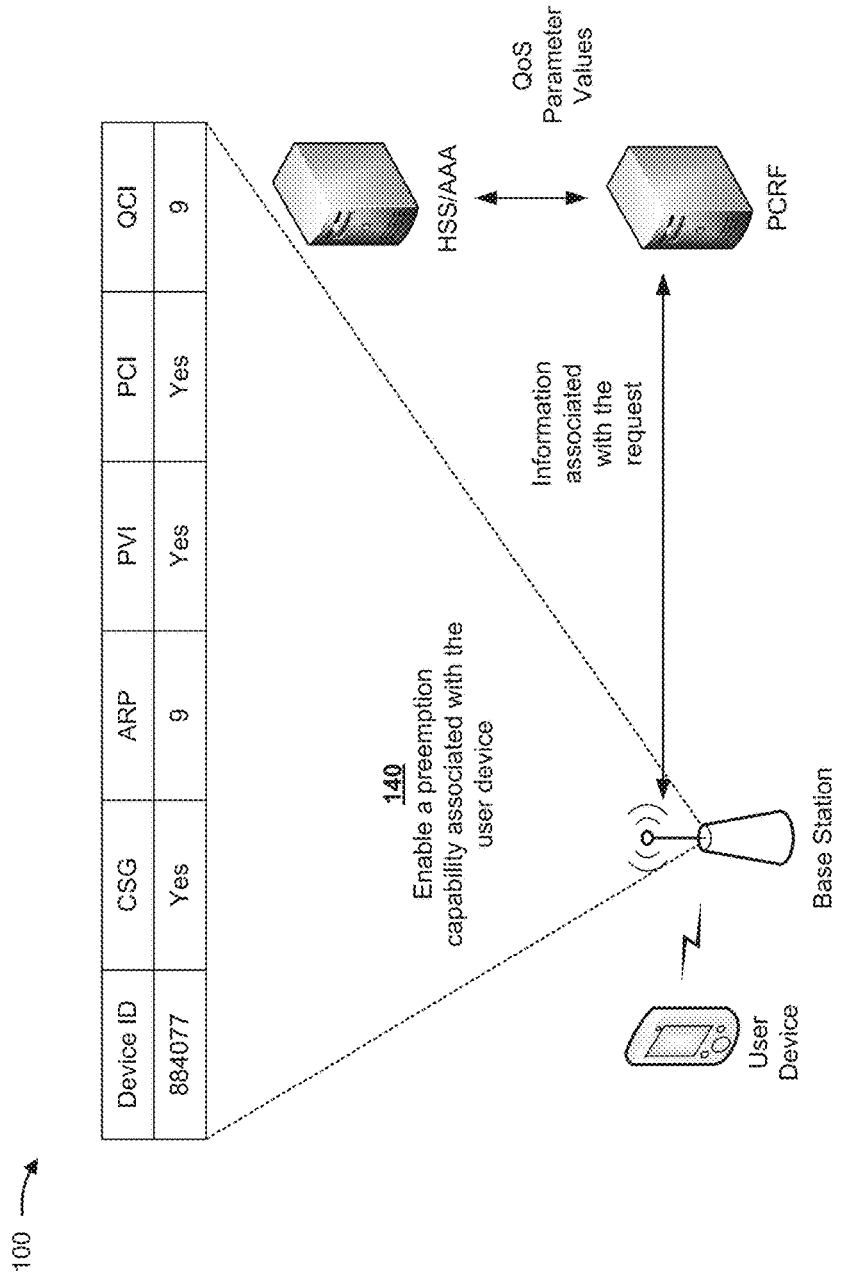

As shown in FIG. 1C, example implementation 100 may include a policy charging and rules function (PCRF) server device, and may include a home subscriber service/authentication, authorization and accounting (HSS/AAA) server device. As further shown in FIG. 1C, the base station may maintain information associated with the user device requesting access (e.g., device 884077), which may include information obtained from and/or shared with the PCRF server device and/or the HSS/AAA server device (e.g., QoS parameter values).

As shown by reference number 140, the base station may enable a preemption capability associated with the user device. A preemption capability may indicate that a user device may receive access to resources that were already allocated to another user device (e.g., another user device that is associated with a particular service type, a particular QoS parameter value, or the like). For example, the base station may set a preemption capability indicator (PCI) value associated with the user device (e.g., may set a PCI value to "Yes"). As further shown in FIG. 1C, the information maintained by the base station may include a CSG identifier, a PCI value, and/or other parameter values (e.g., QoS parameter values). Based on the CSG identifier (e.g., "Yes") (indicating the user device is a member of the CSG associated with the base station) and the PCI value (e.g., "Yes") (indicating the user device may preempt another user device), the base station may, in order to allow the requesting user device to access the requested resource, preempt another user device that has been allocated a resource.

Figure 1D:
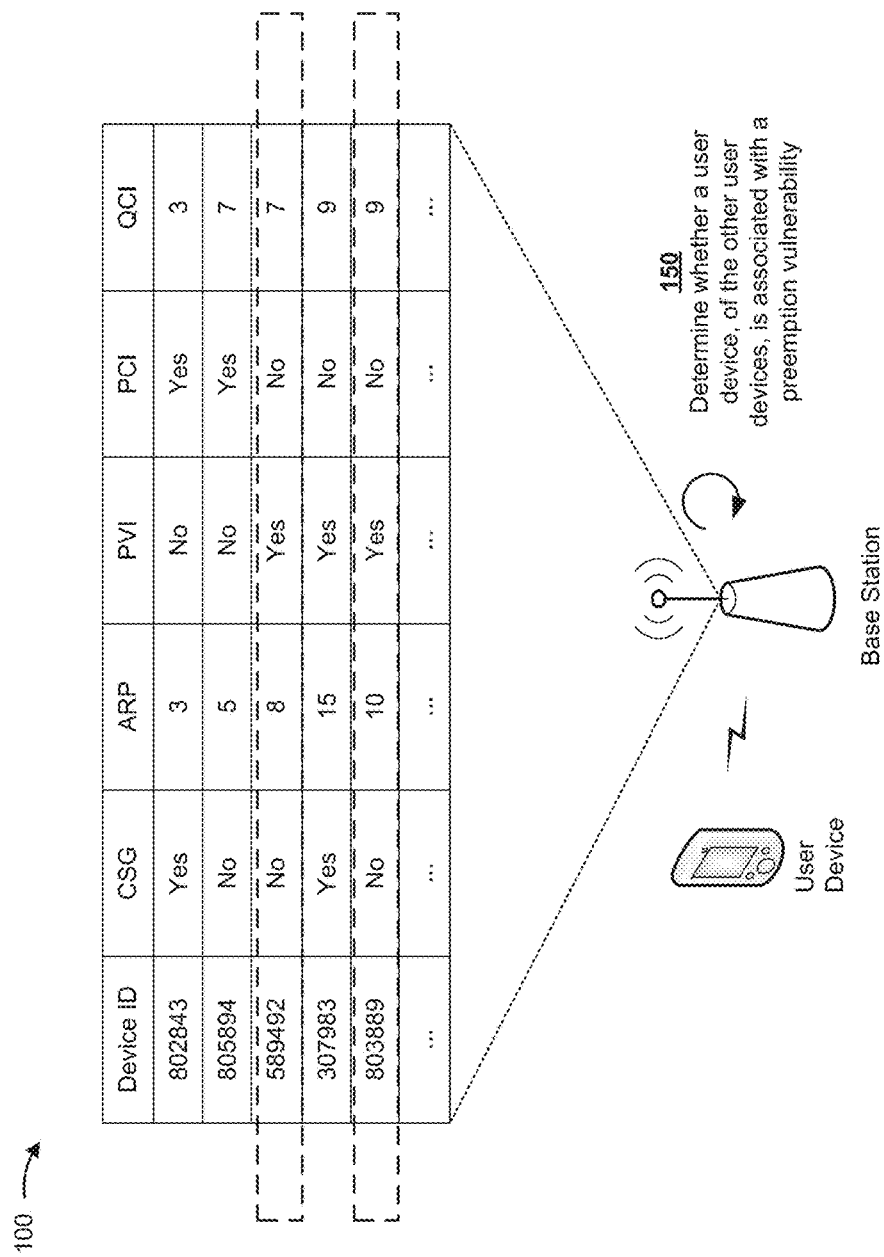

As shown in FIG. 1D, and as shown by reference number 150, the base station may determine whether a user device, of the other user devices, is associated with a preemption vulnerability (e.g., preemption vulnerability indicator (PVI) value="Yes"). Additionally, or alternatively, the base station may receive, from another device, information that identifies that a user device is associated with a preemption vulnerability. A preemption vulnerability may indicate that a user device may lose access to an allocated resource in order for another user device to receive access to a resource. In this case, the base station may identify two user devices (e.g., devices 589492 and 803889) that are vulnerable to be preempted (e.g., are associated with a preemption vulnerability).

Figure 1E:
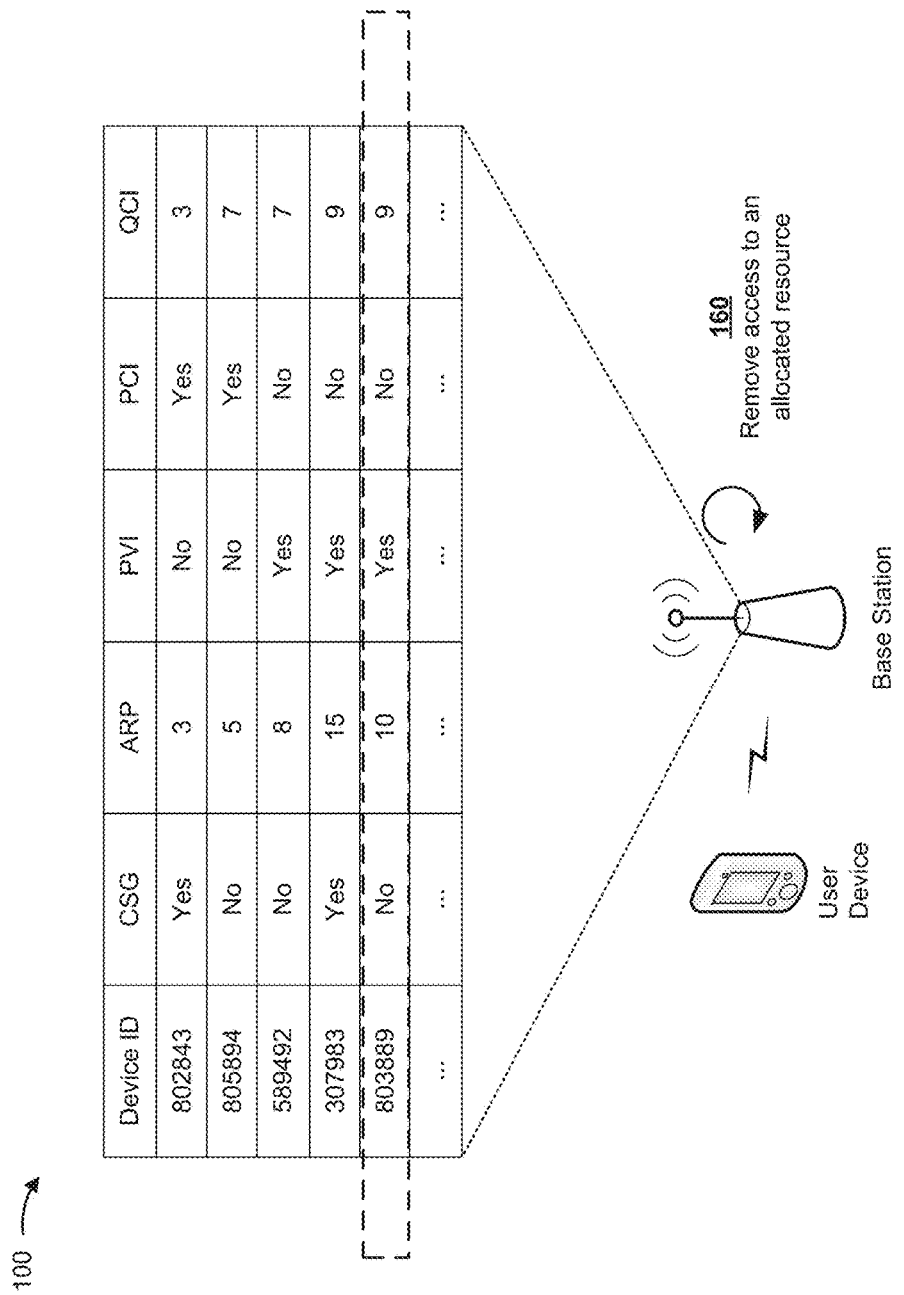

As shown in FIG. 1E, and as shown by reference number 160, the base station may remove access to an allocated resource. Where multiple user devices are identified as vulnerable, the base station may select a user device to preempt based on one or more additional factors, such as a QoS parameter, a connection duration, a condition for handing off to another base station, or the like. For example, the base station may determine which of the vulnerable user devices includes a lowest allocation and retention priority (ARP), as indicated by a highest ARP level, among the vulnerable non-member user devices. In this case, as shown, the base station may preempt a particular user device (e.g., device 803889). In some implementations, the ARP level may be determined based on a weighed value of one or more other QoS parameters, one or more additional factors, a service type associated with a resource, etc. The base station may then provide the user device with access to the requested resource based on preempting the particular user device.

In this way, the base station may allow both CSG member user devices and non-member user devices to access resources when the base station is not congested, yet allow the CSG member user devices to be prioritized for resource allocation during base station congestion. Furthermore, in selecting a non-member user device to preempt, prioritization among the non-member user devices may be established based on information about the non-member user devices, such as preemption vulnerability and/or other factors (e.g., QoS parameters), potentially minimizing disruptive impact caused by the preemption.

As indicated above, FIGS. 1A-1E are provided merely as an example. Other examples are possible and may differ from what was described with regard to FIGS. 1A-1E.

Figure 2:
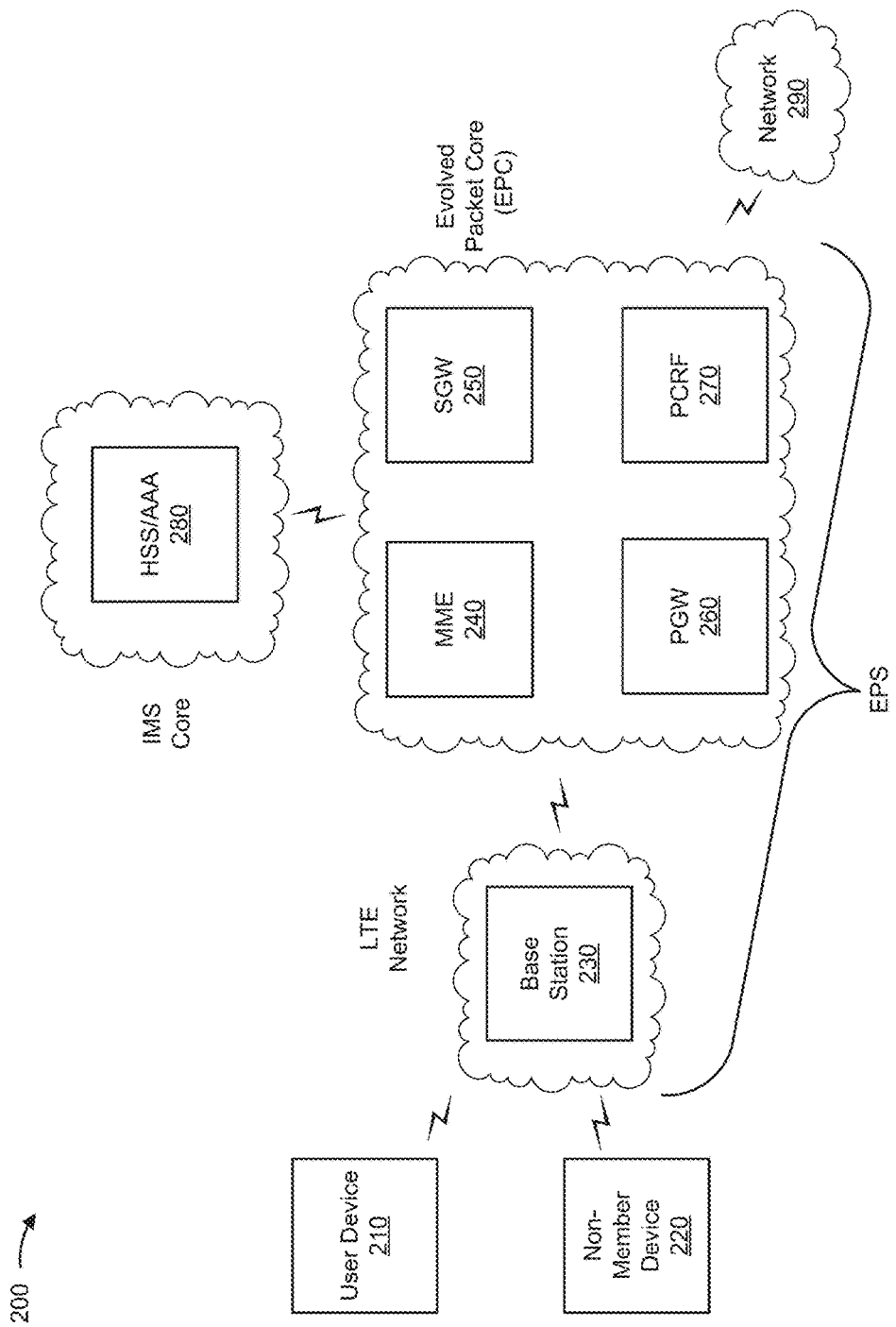
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a non-member device 220, a base station 230, a mobility management entity device (MME) 240, a serving gateway (SGW) 250, a packet data network gateway (PGW) 260, a PCRF 270, an HSS/AAA 280, and a network 290. Devices of environment 200 may interconnect via wired connections, wireless connections, or a combination of wired and wireless connections.

User device 210 includes one or more devices capable of connecting to a network via base station 230. For example, user device 210 may include a communication device, such as a mobile phone (e.g., a smart phone, a radiotelephone, etc.), a tablet computer, a wearable communication device (e.g., a smart wristwatch, a pair of smart eyeglasses, etc.), or a similar type of device. User device 210 may send traffic to and/or receive traffic from network 290 via base station 230 (e.g., based on a radio access bearer between user device 210 and SGW 250). User device 210 may be associated with an RF access signaling usage policy (e.g., an RF access signaling usage billing policy and/or an RF access signaling usage control policy). In some implementations, user device 210 may be associated with a CSG that is associated with base station 230.

Non-member device 220 includes one or more devices capable of connecting to a network via base station 230. For example, non-member device 220 may include a communication device, such as a mobile phone (e.g., a smart phone, a radiotelephone, etc.), a tablet computer, a wearable communication device (e.g., a smart wristwatch, a pair of smart eyeglasses, etc.), or a similar type of device. Non-member device 220 may send traffic to and/or receive traffic from network 290 via base station 230 (e.g., based on a radio access bearer between user device 210 and SGW 250). Non-member device 220 may be associated with an RF access signaling usage policy (e.g., an RF access signaling usage billing policy and/or an RF access signaling usage control policy). In some implementations, non-member device 220 may not be associated with the CSG that is associated with base station 230, however, non-member device 220 may be associated with another CSG that is not associated with base station 230.

Base station 230 includes one or more devices capable of transferring traffic, such as audio, video, text, and/or other traffic, destined for and/or received from user device 210. In some implementations, base station 230 may include a HeNB associated with the LTE network that receives traffic from and/or sends traffic to network 290 via SGW 250 and/or PGW 260. Additionally, or alternatively, one or more base stations 230 may be associated with a radio access network (RAN) that is not associated with an LTE network. Base station 230 may send traffic to and/or receive traffic from user device 210 via an air interface (e.g., an RF signal). In some implementations, base station 230 may include a small cell base station, such as a base station of a femtocell, a microcell, and/or a picocell.

MME 240 includes one or more devices, such as one or more server devices, capable of managing authentication, activation, deactivation, and/or mobility functions associated with user device 210. In some implementations, MME 240 may perform operations relating to authentication of user device 210. Additionally, or alternatively, MME 240 may facilitate the selection of a particular SGW 250 and/or a particular PGW 260 to serve traffic to and/or from user device 210. MME 240 may perform operations associated with handing off user device 210 from a first base station 230 to a second base station 230 when user device 210 is transitioning from a first cell associated with the first base station 230 to a second cell associated with the second base station 230. Additionally, or alternatively, MME 240 may select another MME (not pictured), to which user device 210 should be handed off (e.g., when user device 210 moves out of range of MME 240).

In some implementations, MME 240 may receive and/or store information indicating that user device 210 is associated with an RF access signaling usage billing policy and/or an RF access signaling usage control policy. MME 240 may receive a service request from user device 210, and may cause user device 210 to establish a radio access bearer with SGW 250 via base station 230 based on the service request. MME 240 may perform actions based on an RF access signaling usage control policy (e.g., rerouting RF signals, delaying and/or dropping RF signals, assigning a particular priority to an RF signal, etc.) based on information received from PGW 260 or another device.

SGW 250 includes one or more devices capable of routing packets. For example, SGW 250 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 250 may aggregate traffic received from one or more base stations 230 associated with the LTE network, and may send the aggregated traffic to network 290 (e.g., via PGW 260) and/or other network devices associated with the evolved packet core (EPC) and/or the IP multimedia subsystem (IMS) core. SGW 250 may also receive traffic from network 290 and/or other network devices, and may send the received traffic to user device 210 via base station 230. Additionally, or alternatively, SGW 250 may perform operations associated with handing off user device 210 to and/or from an LTE network. SGW 250 may provide communications to and/or receive communications from PGW 260 (e.g., modify bearer requests based on RF access signaling usage, modify bearer responses based on RF access signaling usage, etc.) in a situation where user device 210 is associated with an RF access signaling usage billing policy and/or an RF access signaling usage control policy.

PGW 260 includes one or more devices capable of providing connectivity for user device 210 to external packet data networks (e.g., other than the depicted EPC and/or LTE network). For example, PGW 260 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 260 may aggregate traffic received from one or more SGWs 250, and may send the aggregated traffic to network 290. Additionally, or alternatively, PGW 260 may receive traffic from network 290, and may send the traffic to user device 210 via SGW 250 and base station 230. PGW 260 may record data usage information (e.g., byte usage), and may provide the data usage information to HSS/AAA 280.

PCRF 270 includes one or more network devices, or other types of communication devices. PCRF 270 may store subscriber information, such as voice call and data rate plans or quotas for subscribers. PCRF 270 may provide network control regarding service data flow detection, gating, QoS, and/or flow-based charging. Policies and rules regarding QoS may include policies and rules instructing user device 210 and/or network elements (base station 230, MME 240, SGW 250, PGW 260, etc.) to minimize packet loss, to implement a packet delay budget, to provide a guaranteed bit rate (GBR), to provide a particular latency, to reduce RF signal congestion, and/or to perform other activities associated with QoS. PCRF 270 may provide policies and rules to other network devices, such as base station 230, SGW 250, PGW 260, or the like, to implement network control. PCRF 270 may determine how a certain service data flow shall be treated, and may ensure that user plane traffic mapping and QoS is in accordance with a user's profile and/or network policies.

HSS/AAA 280 includes one or more devices, such as one or more server devices, capable of managing (e.g., receiving, generating, storing, processing, and/or providing) information associated with user device 210. For example, HSS/AAA 280 may manage subscription information associated with user device 210, such as information that identifies a subscriber profile of a user associated with user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), information that identifies whether user device 210 is associated with an RF access signaling usage control policy and/or an RF access signaling usage billing policy, and/or similar information. HSS/AAA 280 may provide this information to one or more other devices of environment 200 to support the operations performed by those devices.

HSS/AAA 280 may perform authentication operations for user device 210 and/or a user of user device 210 (e.g., using one or more credentials), may control access, by user device 210, to a service and/or an application (e.g., based on one or more restrictions, such as time-of-day restrictions, location restrictions, single or multiple access restrictions, read/write restrictions, RF access signaling usage restrictions, etc.), may track resources consumed by user device 210 (e.g., a quantity of voice minutes consumed, a quantity of data consumed, a quantity of RF signals transmitted, a quantity of radio access bearers requested and/or established, etc.), and/or may perform similar operations.

Network 290 includes one or more wired and/or wireless networks. For example, network 290 may include a cellular network (e.g., an LTE network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
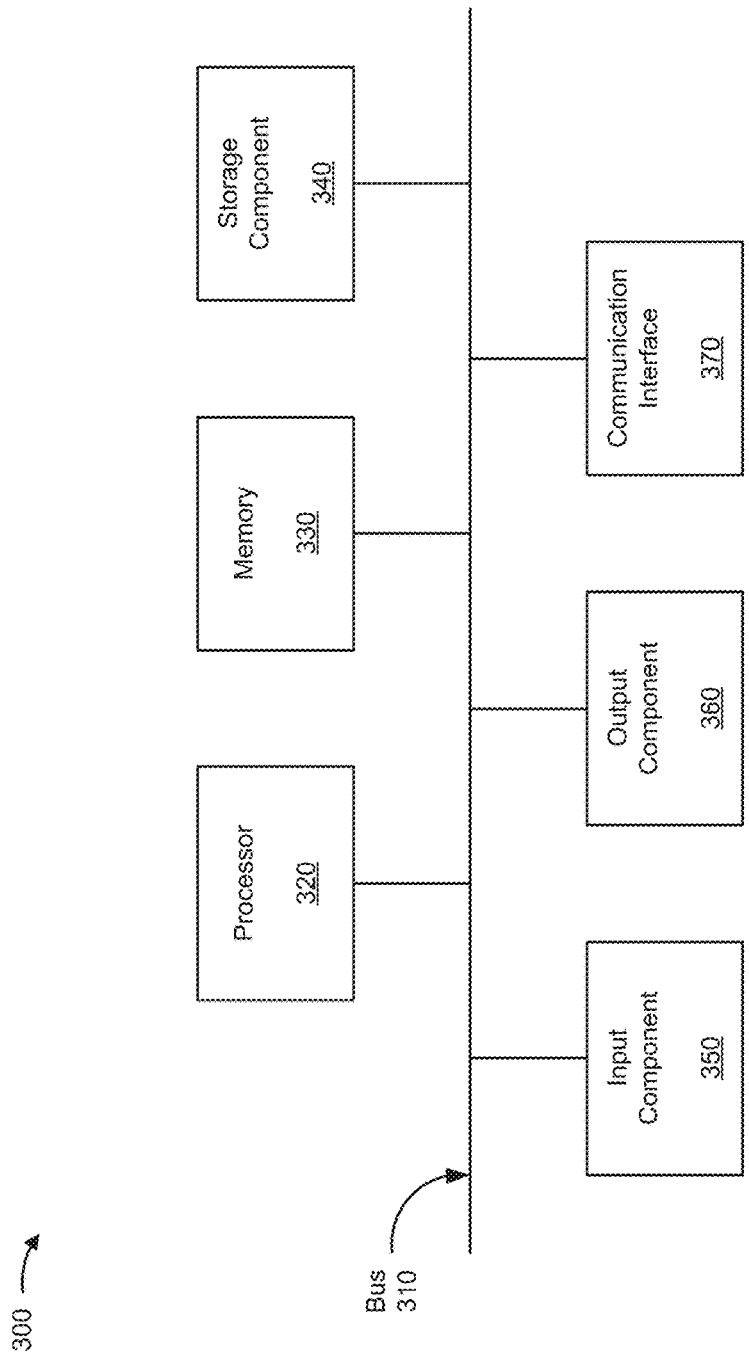
FIG. 3 is a diagram of example components of one or more devices of FIG. 2.

FIG. 3 is a diagram of example components of a device 300. Device 300 may correspond to user device 210, non-member device 220, base station 230, MME 240, SGW 250, PGW 260, PCRF 270, and/or HSS/AAA 280. In some implementations, user device 210, non-member device 220, base station 230, MME 240, SGW 250, PGW 260, PCRF 270, and/or HSS/AAA 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for implementing a preemption policy for a base station operating in closed subscriber group hybrid mode. In some implementations, one or more process blocks of FIG. 4 may be performed by base station 230. In some implementations, one or more process blocks of FIG. 4 may be performed by another device or a group of devices separate from or including base station 230, such as MME 240, SGW 250, PGW 260, PCRF 270 and/or HSS/AAA 280.

As shown in FIG. 4, process 400 may include receiving, from a user device that is associated with a closed subscriber group, a request to access a resource associated with a base station that is operating in closed subscriber group hybrid mode and is under congestion (block 410). For example, base station 230 (e.g., a HeNB) may receive, from user device 210, a request to be allocated a resource associated with base station 230. In some implementations, the resource may include a bearer, a physical resource block (PRB), a radio resource control (RRC) connection, a GBR bandwidth, a non-guaranteed bit rate (non-GBR) bandwidth, or the like. Additionally, or alternatively, the request may include a request to connect to a cellular or other wireless network, a request to access a particular frequency or channel, or the like. In some implementations, the request may include information that identifies user device 210, such as an international mobile subscriber identity (IMSI), a mobile directory number (MDN), a mobile equipment identifier (MEID), or the like.

In some implementations, base station 230 or some other portion of network 200 may determine that user device 210 is associated with a CSG based on the request. In some implementations, the CSG may include information (e.g., a list, such as an access control list, or the like) that identifies user devices 210 that are permitted to access a resource associated with base station 230 (e.g., a list of user devices 210). For example, particular user devices 210 may be registered to be eligible to receive access to a resource associated with base station 230. Additionally, HSS/AAA 280 and/or PCRF 270 may store information identifying the particular user devices 210 that are associated with the CSG.

In some implementations, base station 230 may determine that user device 210 is associated with the CSG associated with base station 230, based on stored information (e.g., by searching a data structure). Additionally, or alternatively, base station 230 may determine that user device 210 is associated with the CSG based on receiving, from PCRF 270 and/or HSS/AAA 280, information that identifies that user device 210 is associated with the CSG. For example, base station 230 may provide, to PCRF 270 and/or HSS/AAA 280, information that identifies user device 210, and may receive information that identifies that user device 210 is associated with the CSG.

In some implementations, the request may include information that identifies a service type requested by user device 210. For example, the service type may include an internet service, a Voice over LTE (VoLTE) service, a messaging service, or the like. Additionally, or alternatively, base station 230 may determine a quality of service (QoS) parameter for the requested resource based on the request, the information that identifies the service type, and/or the information that identifies user device 210. The QoS parameter may include an ARP level, a QoS Class indicator (QCI) value, a PCI value, a PVI value, a guaranteed bit rate (GBR) parameter, a non-GBR parameter, or the like. In some implementations, base station 230 may determine a QoS parameter based on stored information. Additionally, or alternatively, base station 230 may determine the QoS parameter based on receiving, from user device 210, PCRF 270, and/or HSS/AAA 280, information that identifies the QoS parameter. For example, user device 210, PCRF 270, and/or HSS/AAA 280 may provide information that identifies the QoS parameter to base station 230 for use in admission control.

In some implementations, base station 230 may be configured to operate in an open mode, closed mode or a hybrid mode. Base station 230 in hybrid mode enables user devices 210 (e.g., associated with the CSG) and non-member devices 220 (e.g., not associated with the CSG) to be allocated resources associated with base station 230, while giving priority to user devices 210 over non-member devices 220. For example, base station 230 may receive information that causes base station 230 to operate in a hybrid mode (e.g., may receive the information from HSS/AAA 280, PCRF 270, or the like).

In some implementations, base station 230 may be under congestion. For example, base station 230 may determine a congestion level associated with base station 230 and/or a RAN, and may determine that the congestion level satisfies a threshold. In some implementations, the congestion level may be based on a measurable network resource associated with base station 230 and/or a RAN. For example, the measurable network resource may include a quantity of allocated bearers, a quantity of user devices 210 and/or non-member devices 220 connected to the LTE network, associated with base station 230, and/or in communication with base station 230, a bandwidth capacity, a throughput rate, or the like.

In some implementations, the measurable network resource may be associated with a resource requested by user device 210. For example, base station 230 may determine the threshold level at which base station 230 may be considered congested, and the threshold level may be a utilization level of the requested resource. Additionally, or alternatively, the measurable network resource may be different than the requested resource.

In some implementations, base station 230 may determine that base station 230 is congested based on a discrete quantity of the measurable network resource. For example, base station 230 may determine that base station 230 is congested based on a particular quantity of user devices 210 and/or non-member devices 220, for which base station 230 has allocated resources, satisfying a threshold. Additionally, or alternatively, base station 230 may determine that base station 230 is congested based on a percentage associated with a measurable network resource. For example, base station 230 may determine that base station 230 is congested based on a particular percentage of user devices 210 and/or non-member devices 220, for which base station 230 has allocated resources, satisfying a threshold.

As further shown in FIG. 4, process 400 may include determining whether a resource has been allocated to a user device that is not associated with the closed subscriber group (block 420). For example, base station 230 may determine whether resources have been allocated to one or more non-member devices 220. In some implementations, base station 230 may store (e.g., in a data structure, such as a look-up table) information that identifies user devices 210 and/or non-member devices 220 that have been allocated resources (e.g., user devices 210 and/or non-member devices 220 that are associated with an RRC connected state). For example, for each user device 210 and/or non-member device 220 that has been allocated and/or is accessing a resource, base station 230 may store information that identifies a user device identifier, QoS parameters, a time frame associated with the resource allocation, whether the user device 210 and/or non-member device 220 are associated with the CSG, or the like. In some implementations, base station 230 may determine whether resources have been allocated to one or more non-member devices 220 based on the stored information (e.g., by searching the data structure).

As further shown in FIG. 4, if each user device, that has been allocated a resource, is associated with the closed subscriber group (block 420—NO), then process 400 may include allocating resources based on a preemption policy defined by a policy charging and rules function server (block 430). For example, base station 230 may preempt another user device 210 or may deny the request for the resource based on a preemption policy that is defined by PCRF 270. In some implementations, base station 230 may compare one or more QoS parameters, associated with user device 210 that is requesting the resource, and one or more QoS parameters associated with other user devices 210 that have been allocated resources associated with base station 230. Additionally, or alternatively, base station 230 may preempt a particular user device 210 or may deny the request for the resource based on comparing the one or more QoS parameters (e.g., in association with a preemption policy).

As further shown in FIG. 4, if a resource has been allocated to a user device that is not associated with the closed subscriber group (block 420—YES), then process 400 may include enabling a preemption capability associated with the user device that is requesting the resource (block 440). For example, base station 230 may enable user device 210 to be allocated resources that were allocated to another user device (e.g., preempt a non-member device 220).

In some implementations, base station 230 may store (e.g., in a data structure) information that identifies a request for a resource, a user device identifier associated with the request, and/or one or more QoS parameters associated with the request (e.g., a QCI value, an ARP level, a PCI value, a PVI value, or the like). Additionally, or alternatively, base station 230 may assign a particular PCI value (e.g., "Yes") for a request associated with user device 210 that is associated with the CSG. In this way, user devices 210, that are associated with the CSG, may preempt non-member devices 220, despite a PCI value assigned by HSS/AAA 280 and/or PCRF 270. For example, assume that, based on the request for the resource, HSS/AAA 280 assigned a PCI value that did not enable user device 210 to preempt non-member devices 220 (e.g., a "No" value). In this case, base station 230 may override the PCI value assigned by HSS/AAA 280 to permit user device 210 to preempt non-member devices 220 (e.g., a "Yes" value).

As further shown in FIG. 4, process 400 may include determining whether a user device, that is not associated with the closed subscriber group and that has been allocated a resource, is associated with a preemption vulnerability (block 450). For example, base station 230 may identify non-member devices 220 that are not associated with the CSG (e.g., based on searching a data structure), and that have been allocated and/or are accessing a resource associated with base station 230 (e.g., are associated with an RRC connected state). Additionally, base station 230 may determine whether a particular non-member device 220, of the non-member devices 220, is associated with a preemption vulnerability (e.g., is associated with a preemption value that indicates that the particular non-member device 220 may be preempted).

In some implementations, base station 230 may determine whether a non-member device 220 has been assigned a PVI value (e.g., "Yes"), that enables the non-member device 220 to be preempted, based on stored information (e.g., based on searching a data structure). For example, PCRF 270 and/or HSS/AAA 280 may provide information that identifies QoS parameters associated with non-member devices 220 and/or user devices 210 that have been allocated resources with base station 230 (e.g., PCRF 270 and/or HSS/AAA 280 may determine QoS parameters based on service types requested by user device 210 and/or non-member devices 220). As an example, assume that a first non-member device 220, that has been allocated a resource, is associated with a VoLTE call. In this case, base station 230 may receive information that identifies that the first non-member device 220 is not associated with a preemption vulnerability (e.g., PCRF 270 and/or HSS/AAA 280 may not assign a PVI value for the first non-member device 220). Further, assume that a second non-member device 220, that has been allocated a resource, is associated with a lower priority service. In this case, base station 230 may receive (e.g., from PCRF 270 and/or HSS/AAA 280) information that identifies that the second non-member device 220 may be preempted (e.g., based on an ARP level associated with the second non-member device 220, or the like).

As further shown in FIG. 4, if a user device, that is not associated with the closed subscriber group, is associated with a preemption vulnerability (block 450—YES), then process 400 may include removing access, for a user device that is associated with the lowest allocation and retention priority, to an allocated resource (block 460). For example, if base station 230 determines that a particular non-member device 220 is associated with a preemption vulnerability, then base station 230 may remove access, for the particular non-member device 220, to the allocated resource. For example, base station 230 may disconnect non-member device 220, preempt non-member device 220, initiate an RRC connection release, or the like. Additionally, or alternatively, base station 230 may re-direct the particular non-member device 220 to another base station 230 (e.g., a base station of a macrocell).

In some implementations, base station 230 may determine a single non-member device 220 that is associated with a preemption vulnerability. In this case, base station 230 may remove access to an allocated resource for the single non-member device 220 (e.g., may select the single non-member device 220 to be preempted). Alternatively, base station 230 may determine multiple non-member devices 220 that are associated with a preemption vulnerability. In this case, base station 230 may select a particular non-member device 220 to preempt based on one or more additional factors, as described below.

In some implementations, base station 230 may remove access for a particular non-member device 220 based on a QoS parameter value. For example, base station 230 may remove access for a particular non-member device 220 that is associated with the lowest ARP priority (e.g., having the highest numbered ARP level). As an example, assume that a first non-member device 220 is associated with a first ARP level (e.g., level 1), and that a second non-member device 220 is associated with a second ARP level (e.g., level 9). In this case, base station 230 may preempt the second non-member device 220. Additionally, or alternatively, base station 230 may remove access based on a different QoS parameter (e.g., a QCI value or the like).

Additionally, or alternatively, base station 230 may remove access for a particular non-member device 220 based on another factor. For example, base station 230 may remove access based on time frames for which resources have been allocated (e.g., RRC connection durations, time frames for which non-member devices 220 have been in RRC connected mode, or the like). In some implementations, base station 230 may determine multiple non-member devices 220 that each includes a same QoS parameter value (e.g., identical ARP levels, QCI values, or the like). For example, base station 230 may determine multiple non-member devices 220 that include the same ARP level, similar ARP levels, or the like. In this case, base station 230 may remove access to a particular non-member device 220 that has been allocated resources for the longest duration, a particular non-member device 220 that has been selected at random, a particular non-member device 220 that best meets a condition for handing off to another base station 230, or the like.

In some implementations, base station 230 may determine that a particular non-member device 220 is associated with a particular service type (e.g., an emergency call, an enhanced multimedia priority service, or the like), and may not remove access for the particular non-member device 220 despite a PVI value, ARP level, or other factors indicating that the particular non-member device 220 is a candidate for preemption.

In some implementations, base station 230 may grant access, for user device 210, to the requested resource based on removing access for non-member device 220. In this way, base station 230 may enable user devices 210 and non-member devices 220 to access resources when base station 230 is not congested, while enabling user devices 210 to be prioritized for resource allocation during congestion (e.g., enable user devices 210 to preempt non-member devices 220).

As further shown in FIG. 4, if each user device, that is not associated with the closed subscriber group, is not associated with a preemption vulnerability (block 450—YES), then process 400 may include ignoring the preemption vulnerability and removing access, for a user device that is associated with the lowest allocation and retention priority, to an allocated resource (block 470). For example, if base station 230 determines that each non-member device 220, that has been allocated a resource, is not associated with a preemption vulnerability (e.g., PVI value="No"), then base station 230 may remove access to a resource for a particular non-member device 220, despite the particular non-member device 220 not being associated with a preemption vulnerability (e.g., may ignore the preemption vulnerability). In some implementations, base station 230 may remove access for non-member device 220 in a similar manner as described above in connection with block 460. For example, in the case of multiple non-member devices 220, base station 230 may select a particular non-member device 220 to preempt based on a QoS parameter (e.g., an ARP level, or the like) and/or one or more other factors.

In this way, base station 230 may override an assigned PVI value (e.g., assigned by HSS/AAA 280 and/or PCRF 270). For example, base station 230 may preempt non-member device 220 despite non-member device 220 not being associated with a PVI value, and/or despite non-member device 220 being associated with a higher priority value than user device 210 (e.g., a QoS parameter value). Additionally, base station 230 may remove access for non-member device 220, thereby enabling user device 210 to be granted access to the requested resource. In this way, user device 210 may be granted access to a resource during congestion of base station 230, despite a particular PCI value, PVI value, QoS parameter, or the like, of user device 210 and/or non-member device 220.

Implementations described herein enable base station 230 to provide, to user device 210, access to a resource during congestion. Additionally, implementations described herein enable base station 230 to identify non-member devices 220, and select a particular non-member device 220 for which to remove access to a resource. In this way, implementations described herein may enable base station 230 to operate in hybrid mode while ensuring that user devices 210, associated with a CSG, may be provided access to a resource. In this way, implementations described herein may prevent communication issues (e.g., radio link failure, low data throughput, RRC drop, etc.) associated with user devices 210, thereby conserving processor and/or memory resources of user devices 210, and conserving network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, network coverage and capacity may be increased by a small, low power base station, such as a femtocell base station (e.g., a HeNB), in a way that allows both CSG member user devices and non-member user devices to access resources when the base station is not congested, yet allows the CSG member user devices to be prioritized for access to resources, over non-member user devices, during base station congestion. Furthermore, in selecting a non-member user device to preempt, prioritization among the non-member user devices may be established based on information about the non-member user devices, such as preemption vulnerability and/or other factors (e.g., QoS parameters), potentially minimizing disruptive impact of the preemption.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, from a first user device, a request to access a first resource associated with the device,
the first user device being associated with a closed subscriber group;
determine that a congestion level, associated with the device, satisfies a threshold value;
identify a second user device that has been allocated a second resource associated with the device based on the request and based on the congestion level satisfying the threshold value,
the second user device not being associated with the closed subscriber group;
enable the first user device to preempt the second user device based on the second user device not being associated with the closed subscriber group;

determine that the second user device is not associated with a preemption vulnerability based on the second user device not being associated with the closed subscriber group;
override a preemption value for the second user device based on determining that the second user device is not associated with the preemption vulnerability; and
remove, for the second user device, access to the second resource based on enabling the first user device to preempt the second user device and based on overriding the preemption value for the second user device.

2. The device of claim 1,
where the preemption value for the second user device is a first preemption value; and
where the one or more processors are further to:
identify a third user device that has been allocated a third resource associated with the device,
the third user device not being associated with the closed subscriber group, and
the third user device being associated with a second first preemption value;
and
where the one or more processors, when removing, for the second user device, access to the second resource, are to:
remove, for the second user device, access to the second resource based on the second user device being associated with the first preemption value and based on the third user device being associated with the second preemption value.

3. The device of claim 1, where the one or more processors are further to:
identify a third user device that has been allocated a third resource associated with the device,
the third user device not being associated with the closed subscriber group;
determine a first quality of service parameter value associated with the second user device;
determine a second quality of service parameter value associated with the third user device; and
where the one or more processors, when removing, for the second user device, access to the second resource, are to:
remove, for the second user device, access to the second resource based on the first quality of service parameter value and the second quality of service parameter value.

4. The device of claim 1, where the one or more processors are further to:
identify a third user device that has been allocated a third resource associated with the device,
the third user device not being associated with the closed subscriber group;
determine a first time frame for which the second user device has been allocated the second resource;
determine a second time frame for which the third user device has been allocated the third resource; and
where the one or more processors, when removing, for the second user device, access to the second resource, are to:
remove, for the second user device, access to the second resource based on the first time frame and the second time frame.

5. The device of claim 1, where the device is a base station.

6. The device of claim 1, where the one or more processors, when determining that the congestion level satisfies the threshold value, are to:
determine that the congestion level satisfies the threshold value based on a quantity of user devices that have been allocated resources associated with a radio access network.

7. The device of claim 1, where the one or more processors are further to:
receive information that causes the device to operate in a hybrid mode; and
where the one or more processors, when removing, for the second user device, access to the second resource, are to:
remove, for the second user device, access to the second resource based on the information that causes the device to operate in the hybrid mode.

8. A non-transitory computer-readable medium storing instructions, the instructions comprising:
one or more instructions that, when executed by one or more processors of a device, cause the one or more processors to:
receive, from a first user device, a request to access a first resource associated with a radio access network,
the first user device being associated with a closed subscriber group;
determine that a congestion level, associated with the radio access network, satisfies a threshold value after receiving the request;
identify a second user device that has been allocated a second resource based on the congestion level satisfying the threshold value,
the second user device not being associated with the closed subscriber group;
enable the first user device to preempt the second user device based on the second user device not being associated with the closed subscriber group;
determine that the second user device is not associated with a preemption vulnerability based on the second user device not being associated with the closed subscriber group;
override a preemption value for the second user device based on determining that the second user device is not associated with the preemption vulnerability; and
remove, for the second user device, access to the second resource based on enabling the first user device to preempt the second user device and based on overriding the preemption value for the second user device.

9. The non-transitory computer-readable medium of claim 8, where the one or more instructions, when executed by the one or more processors, further cause the one or more processors to:
identify a third user device that has been allocated a third resource associated with the radio access network,
the third user device not being associated with the closed subscriber group;
determine a first quality of service parameter value associated with the second user device;
determine a second quality of service parameter value associated with the third user device; and
where the one or more instructions, that cause the one or more processors to remove, for the second user device, access to the second resource, cause the one or more processors to:

remove, for the second user device, access to the second resource based on the first quality of service parameter value and the second quality of service parameter value.

10. The non-transitory computer-readable medium of claim 8, where the one or more instructions, when executed by the one or more processors, further cause the one or more processors to:
 determine a quantity of user devices that have been allocated resources associated with the radio access network,
  the user devices including the second user device; and
 where the one or more instructions, that cause the one or more processors to determine that the congestion level satisfies the threshold value, cause the one or more processors to:
  determine that the congestion level satisfies the threshold value based on the quantity of user devices that have been allocated the resources associated with the radio access network.

11. The non-transitory computer-readable medium of claim 8,
 where the preemption value for the second user device is a first preemption value; and
 where the one or more instructions, when executed by the one or more processors, further cause the one or more processors to:
  identify a third user device that has been allocated a third resource,
   the third user device not being associated with the closed subscriber group, and
   the third user device being associated with a second preemption value;
  and
  where the one or more instructions, that cause the one or more processors to remove, for the second user device, access to the second resource, cause the one or more processors to:
   remove, for the second user device, access to the second resource based on the first preemption value and the second preemption value.

12. The non-transitory computer-readable medium of claim 8, where the first resource includes at least one of:
 a bearer;
 a physical resource block; or
 a radio resource control connection.

13. The non-transitory computer-readable medium of claim 8, where the device is a base station operating in a hybrid mode.

14. The non-transitory computer-readable medium of claim 8, where the one or more instructions, when executed by the one or more processors, further cause the one or more processors to:
 identify a third user device that has been allocated a third resource associated with the device,
  the third user device not being associated with the closed subscriber group;
 determine a first time frame for which the second user device has been allocated the second resource; and
 determine a second time frame for which the third user device has been allocated the third resource,
 where the one or more instructions, that cause the processors to remove, for the second user device, access to the second resource, cause the one or more processors to:
  remove, for the second user device, access to the second resource based on the first time frame and the second time frame.

15. A method, comprising:
 receiving, by a device and from a first user device, a request to access a first resource associated with the device,
  the first user device being associated with a closed subscriber group associated with the device;
 determining, by the device, that a congestion level associated with the device satisfies a threshold value;
 identifying, by the device, a second user device that is accessing a second resource associated with the device based on the congestion level satisfying the threshold value,
  the second user device not being associated with the closed subscriber group;
 enabling, by the device, the first user device to preempt the second user device based on the second user device not being associated with the closed subscriber group;
 determining, by the device, that the second user device is not associated with a preemption vulnerability based on the second user device not being associated with the closed subscriber group;
 overriding, by the device, a preemption value for the second user device based on determining that the second user device is not associated with the preemption vulnerability; and
 removing, by the device and for the second user device, access to the second resource based on enabling the first user device to preempt the second user device and based on overriding the preemption value for the second user device.

16. The method of claim 15, further comprising:
 identifying a third user device that is accessing a third resource associated with the device,
  the third user device not being associated with the closed subscriber group;
 comparing a first quality of service parameter value associated with the second user device and a second quality of service parameter value associated with the third user device; and
 where removing, for the second user device, access to the second resource comprises:
  removing access to the second resource based on comparing the first quality of service parameter value and the second quality of service parameter value.

17. The method of claim 15, further comprising:
 identifying a third user device that is accessing a third resource associated with the device;
 determining a first allocation and retention priority level associated with the second user device and a second allocation and retention priority level associated with the third user device; and
 where removing, for the second user device, access to the second resource comprises:
  removing access to the second resource based on the first allocation and retention priority level and the second allocation and retention priority level.

18. The method of claim 15, further comprising:
 identifying a third user device that is accessing a third resource associated with the device;
 determining a first duration associated with the third user device accessing the third resource;
 determining a second duration associated with the second user device accessing the second resource; and where removing, for the second user device, access to the second resource comprises:
   removing, for the second user device, access to the second resource based on the first duration and the second duration.

19. The method of claim 15, further comprising:
receiving information that causes the device to operate in a hybrid mode; and
where removing, for the second user device, access to the second resource comprises:
   removing, for the second user device, access to the second resource based on the information that causes the device to operate in the hybrid mode.

20. The method of claim 15, further comprising:
re-directing the second user device to a base station.

* * * * *